United States Patent
De Geeter et al.

(10) Patent No.: US 9,549,105 B2
(45) Date of Patent: Jan. 17, 2017

(54) CONTAINER SCANNING SYSTEM

(71) Applicant: CAMCO TECHNOLOGIES NV, Heverlee (BE)

(72) Inventors: Jef Simon Gaston De Geeter, Leuven (BE); Jan Amandus Michel Maria Bossens, Linden (BE)

(73) Assignee: CAMCO TECHNOLOGIES NV, Heverlee (BE)

( * ) Notice: Subject to any disclaimer, the term of this patent is extended or adjusted under 35 U.S.C. 154(b) by 0 days.

(21) Appl. No.: 14/440,142

(22) PCT Filed: Nov. 11, 2013

(86) PCT No.: PCT/EP2013/073515
§ 371 (c)(1),
(2) Date: May 1, 2015

(87) PCT Pub. No.: WO2014/072509
PCT Pub. Date: May 15, 2014

(65) Prior Publication Data
US 2015/0296105 A1    Oct. 15, 2015

(30) Foreign Application Priority Data

Nov. 9, 2012  (EP) .................................... 12191970

(51) Int. Cl.
*H04N 5/225* (2006.01)
*B66C 13/46* (2006.01)
(Continued)

(52) U.S. Cl.
CPC ............. *H04N 5/2252* (2013.01); *B66C 13/46* (2013.01); *B66C 19/002* (2013.01); *H04N 7/18* (2013.01)

(58) Field of Classification Search
CPC .................................................. H04N 5/2252
See application file for complete search history.

(56) References Cited

U.S. PATENT DOCUMENTS

| 7,783,003 B2 | 8/2010 | Clayton et al. |
| 2004/0057718 A1* | 3/2004 | Chapman .............. B66F 11/048 396/428 |

(Continued)

FOREIGN PATENT DOCUMENTS

| DE | 19630187 A1 | 1/1998 |
| EP | 1748335 A2 | 1/2007 |

(Continued)

OTHER PUBLICATIONS

Extended European Search Report for corresponding European Application No. 12191970.8, Apr. 23, 2013.

(Continued)

*Primary Examiner* — Tung Vo
*Assistant Examiner* — Rowina Cattungal
(74) *Attorney, Agent, or Firm* — Workman Nydegger

(57) ABSTRACT

A container scanning system comprises a rail, a camera/sensor unit and a control unit. The rail is mounted on a support or beam of a container handling crane. The camera/sensor unit is movably mounted along the rail. The camera/sensor unit comprises a camera and/or a sensor for scanning the exterior surface of a container. The control unit is operationally coupled to the camera/sensor unit. The control unit is able to obtain position information indicative for the operational position of the container handling crane, and the control unit is adapted to control movement of the camera/sensor unit along the rail in function of the position information. The rail contains space for wiring for power feeding the camera/sensor unit.

20 Claims, 10 Drawing Sheets

(51) Int. Cl.
*B66C 19/00* (2006.01)
*H04N 7/18* (2006.01)

(56) References Cited

U.S. PATENT DOCUMENTS

| | | | |
|---|---|---|---|
| 2004/0126015 A1 | 7/2004 | Hadell | |
| 2005/0232626 A1* | 10/2005 | Schulte | B66C 13/46 396/515 |
| 2005/0232733 A1* | 10/2005 | Maurer | B66C 13/085 414/334 |
| 2007/0235404 A1* | 10/2007 | Catanzaro | B66C 13/44 212/312 |
| 2007/0289931 A1* | 12/2007 | Henriksson | B66C 13/063 212/274 |
| 2009/0208312 A1* | 8/2009 | De Jong | B65G 63/004 414/140.3 |
| 2011/0272376 A1* | 11/2011 | Jung | B66C 11/08 212/276 |

FOREIGN PATENT DOCUMENTS

| | | | |
|---|---|---|---|
| WO | 2004058623 A1 | 7/2004 | |
| WO | 2009052854 A1 | 4/2009 | |
| WO | WO 2009052854 A1 * | 4/2009 | B66C 13/16 |

OTHER PUBLICATIONS

International Preliminary Report on Patentability for corresponding International PCT Application No. PCT/EP2013/073515, Nov. 19, 2014.

International Search Report for corresponding International PCT Application No. PCT/EP2013/073515, Dec. 20, 2013.

* cited by examiner

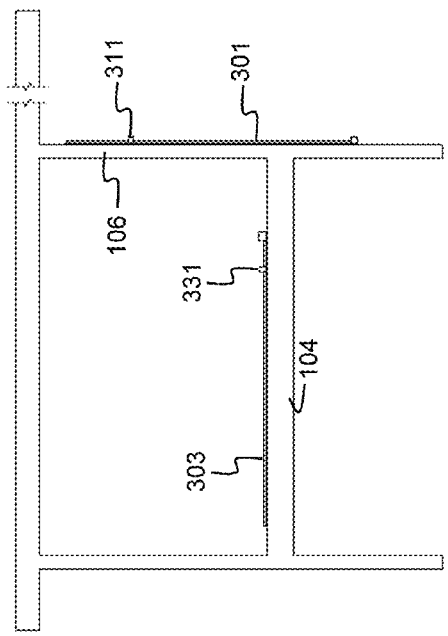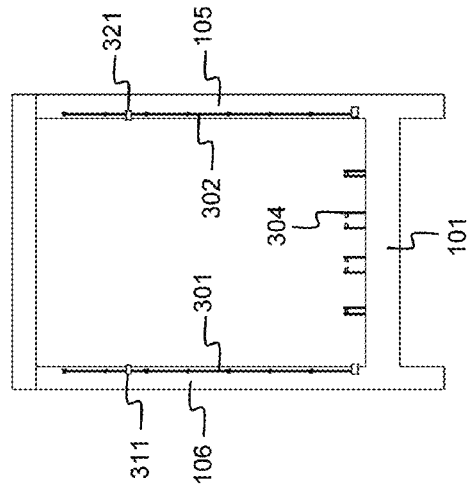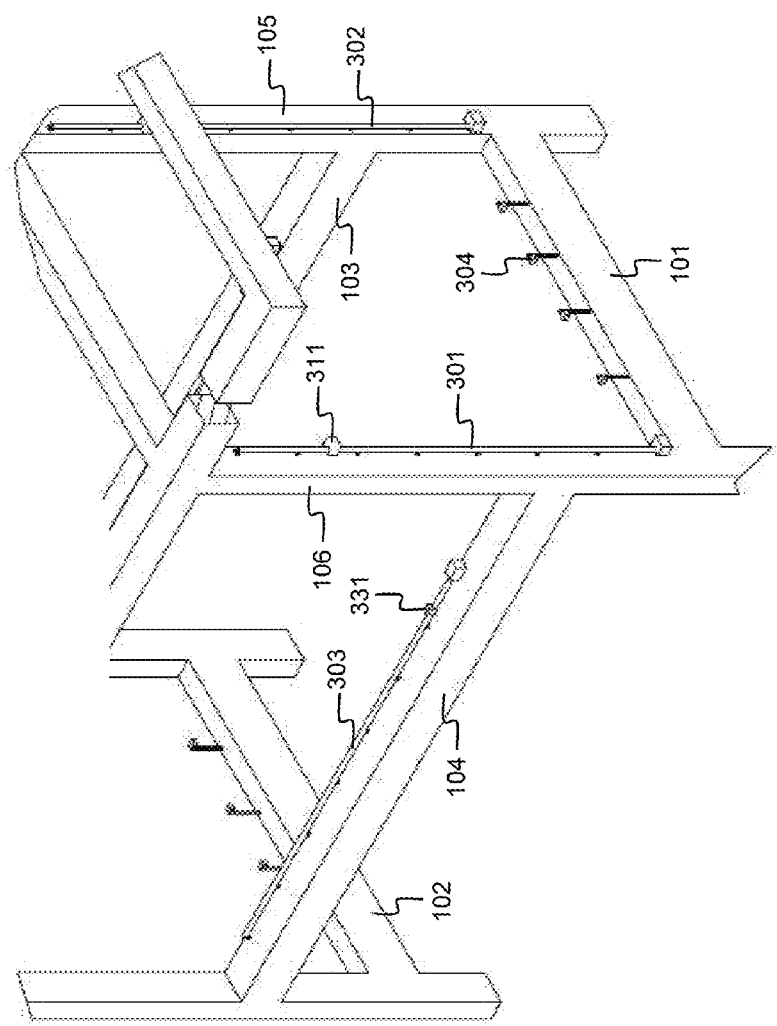

CONTAINER SCANNING SYSTEM

FIELD OF THE INVENTION

The present invention generally relates to a container scanning system, i.e. camera-based or sensor-based recognition and reading of an item or simply detecting the presence of an item by scanning the exterior surface of cargo containers that are transferred by a container handling crane. The item can be a container identification, a class identification, an IMDG code or International Maritime Dangerous Goods code, a seal, etc. The invention is applicable to different types of cranes that handle cargo containers in port or railway areas like for instance ship-to-shore or STS cranes, i.e. semi-automatic cranes that load containers onto a ship or unload containers from a ship under supervisory control of an operator, rail mounted gantry or RMG cranes used for stacking containers in a storage area of the container terminal, rubber tired gantry or RTG cranes used for stacking containers in a storage area of a container terminal, automatic rail mounted gantry or ARMG cranes that are fully automated and enable a single operator to supervise many cranes, automatic stacking cranes or ASCs, etc. The invention is further applicable in situations where the crane's spreader transfers a single container or multiple containers.

BACKGROUND OF THE INVENTION

In order to be able to register and track individual containers that are loaded/unloaded to/from a ship, a train, a truck chassis or trailer, containers are given a unique identification (ID) that is marked on an exterior surface of the container. The container identification typically is an alphanumeric code that is marked onto the top-side, front-side, rear-side or a side of the container. In addition to the container identification, other information marked onto the container or attached to the container may be read or recognized each time a container is transferred by a container handling crane. An example of such additional information is the seal attached to container doors, typically at the rear-side of the container. The seal may for instance contain an RFID (Radio-Frequency Identification) tag. Other examples are a class identification or the IMDG (International Maritime Dangerous Goods) code when dangerous or hazardous materials are contained.

United States Patent Application US 2004/0126015 entitled "Container Identification and Tracking System" describes a system for automatically identifying containers that are loaded/unloaded by a crane. The system consists of several cameras fixedly mounted on the sill beams of the crane. These cameras are referenced 13a, 13b and 13c in FIG. 6 of US 2004/0126015 whereas the sill beams of the crane are referenced 12a and 12b. These sill beams are horizontal beams of the container handling crane, typically mounted at a height of 6 meter from the quay in a direction perpendicular to the boom of the crane, i.e. parallel to the quay border. The sill beam mounted cameras create a scan window at a height of 6 meters where the exterior surface of the side of the container can be scanned, typically while the container is vertically moved by the spreader. In order to decide which camera(s) to activate, the system described in US 2004/0126015 contains a camera control system that receives information indicative for the horizontal position where the container will pass, the so called spreader width information in paragraph [0043] of US 2004/0126015.

The sill beam solution is disadvantageous for various reasons as will be explained in the following paragraphs.

Firstly, the container identification becomes available late in the container handling process. The sill beam solution enables to scan and read a container identification only at the point in time where the spreader holding the container passes the window at 6 meter height above the quay where the cameras are located. In case of unloading a container from a ship, the information identifying the container is available very late in the process of transferring the container, i.e. only a few seconds before the container is unlocked from the spreader.

Secondly, the sill beam solution negatively impacts the performance of a container terminal, typically expressed or measured as the amount of moves a crane can make per hour. Since the spreader has to move the container through a fixed window where the cameras are able to scan the container identification, the process of loading/unloading a container is slowed down, which negatively impacts the overall performance of the container terminal.

Thirdly, the sill beam solution is expensive in maintenance since it requires plural cameras. In the implementation illustrated by FIGS. 5 and 6, and described in paragraph [0043] of US 2004/0126015 for instance, three cameras are mounted on each of the sill beams. Since these cameras are operating in difficult conditions resulting from the presence of wind and water in port or railway areas, their lifetime is limited and maintenance requirements are high. Plural cameras mounted on the sill beams consequently increase the installation and operational costs for the container terminal operator.

Further disadvantageously, front-sides and rear-sides of the containers cannot be scanned in the sill beam solution. Since the cameras are mounted on the sill beams, only container identifications marked on the side of the container can be scanned. In case the container identification or other useful information such as the IMDG code or seal is marked on or attached to a front-side or rear-side of the container, the sill beam mounted cameras cannot be used. A straightforward solution enabling to scan front-sides and rear-sides of containers could consists in mounting also cameras on the portal beams of the crane, i.e. the horizontal beams parallel to the boom of the crane at a typical height of 13 to 16 meter from the quay. Such additional cameras however would further increase the installation and maintenance costs for the terminal operator and would further slow down the container handling process since the spreader would have to move the container(s) through a second scan window at a typical height of 13 to 16 meter. An alternative solution enabling to scan front-sides and rear-sides of containers consists in a crane system with rotating flywheel to rotate the container as for instance suggested in U.S. Pat. No. 7,783,003 entitled "Rotating Carriage Assembly for Use in Scanning Cargo Conveyances Transported by a Crane". Such solution however requires a dedicated type of crane with rotating flywheel and therefore is not applicable to installed cranes that lack such flywheel.

It is further important to notify that there is an evolution towards development and installation of higher cranes. Whereas today's cranes have typical hoisting heights of 30 meters above rail or quay level, next generation cranes will have heights that extend beyond 50 meters. These cranes will be able to operate at different heights. The maintenance or reparation of electronics or components that operate at such heights will become even more difficult, in particular in harbours where the environmental conditions of wind and water are hard. Moreover, the availability of boom trucks that can be used for maintenance purposes and can reach heights above 30 meters is scarce.

International patent application WO 2009/052854 entitled "Device, Method and System for Recording Inspection Data About a Freight Container" describes a container handling crane with cameras movably mounted on a vertical support or horizontal beam. As is specified in WO 2009/052854 on page 3, lines 14-27, the movement of the cameras is controlled by using the container position and speed, obtained from a crane control system.

Although the container scanning system known from WO 2009/052854 aims at scanning the container short sides—see WO 2009/052854, page 2, line 31 to page 3, line 2—and the presence of IMO placards, the door type, door direction, condition of door seal—see page 9, lines 27-32—the system known from WO 2009/052854 is still disadvantageous for several reasons.

Firstly, WO 2009/052854 fails to describe how the cameras are made movable along the vertical supports or horizontal beams of the crane. Straightforward implementations would rely on cables along which the camera would move, or on movable arms that would take the cameras to the desired positions. Such implementations that make use of cables or movable arms however poorly perform in hard environmental conditions resulting from the presence of wind, water and salt in port or railway areas. Straightforward implementations with movable cameras in other words require regular inspection and maintenance as a result of which their downtime and operational costs are high.

Secondly, the system known from WO 2009/052854 does not allow to scan containers that are moved along an optimal path. The optimal path followed by the crane to unload/load a container depends on the origin/destination location of the container on the ship and the destination/origin location of the container on the quay. This optimal path is different for each container: it will be ascending for certain containers near the crane leg where the movable camera is mounted on, whereas it will be descending for other containers near that same leg. As a result of these differences in nature of the optimal paths followed by different containers, merely using the container position and speed to control the position of the camera/sensor is insufficient to guarantee a successful scan. The system known from WO 2009/052854 consequently can only make successful scans when the crane is controlled to deviate from the optimal path as a result of which unloading/loading containers becomes slower and the overall performance of the crane is reduced.

The system known from WO 2009/052854 also is restricted to make a single image at time t+1 (see step 30 in FIG. 2). Only in embodiments where a second camera is provided, a second image can be made of a container side (see steps 210 and 212 in FIG. 4). The system hence has clear technical limitations that can only be resolved at the cost of more cameras/sensors, and the inherent corresponding cost of increased maintenance and downtime.

It is therefore an objective of the present invention to provide a container scanning system that resolves the above identified shortcomings of the prior art. More particularly, it is an objective of the present invention to disclose a container scanning system that scans a container identification or other information marked on or attached to the front-side, rear-side or sides of a container, wherein the scanned information becomes available early in the container handling process, and which enables to increase the overall terminal performance with a less costly and less labour-intensive solution in terms of required electronics and cameras, and with increased reliability. It is in particular an objective of the present invention to disclose a container scanning system with movable cameras that reduces the downtime for maintenance in comparison to straightforward implementations, and that allows the crane to move each container along the optimal unload/load path in order to further optimize the terminal performance. It is a further objective to enable making plural scans without a need to multiply the camera/sensor infrastructure.

SUMMARY OF THE INVENTION

According to the present invention, the above identified objectives are realized by a container scanning system as defined by claim 1, comprising:

a camera/sensor unit movably mounted on a container handling crane, the camera/sensor unit comprising a camera and/or a sensor for scanning the exterior surface of a container; and a control unit operationally coupled to the camera/sensor unit, the control unit being able to obtain position information indicative for the operational position of the container handling crane, and the control unit being adapted to control movement of the camera/sensor unit, wherein:

the container scanning system comprises a rail mounted on a support beam of the container handling crane, the rail containing space for wiring;

the camera/sensor unit is movably mounted along the rail; and the container scanning system further comprises power lines in the space for wiring for power feeding the camera/sensor unit, wherein:

the rail is mounted substantially vertically on a sea-side support or land-side support of the container handling crane;

the operational position is an operational height of the container handling crane; and the camera/sensor unit is moved along the rail to the operational height where the camera and/or said sensor is able to scan the exterior surface of the container while the container is moved across the vertical sea-side support or land-side support by the container handling crane, and/or wherein:

the rail is mounted substantially horizontally on a portal beam of the container handling crane;

the operational position is a distance from the quay border or a lane wherein the container is loaded or unloaded by the container handling crane; and the camera/sensor unit is moved along the rail to a position where it is able to scan the exterior surface of a front-side or rear-side of the container while the container is moved vertically across the portal beam by the container handling crane.

Thus, the invention consists of a camera/sensor unit movably mounted along a rail that is fixed on a substantially vertical support and/or a substantially horizontal beam of the crane. A control unit on or near the crane controls the movements of the camera/sensor unit along the rail in function of the operational position of the crane. As a result, it is no longer needed for the spreader to move the container(s) through a particular window (height, width) where a fixed camera is located, since the camera/sensor unit is now moved to the height (or alternatively the depth or width) where the container is handled by the crane. An immediate advantage thereof is that the invention improves the overall performance of the terminal since a higher amount of moves per hour can be executed.

The use of a rail is advantageous over straightforward implementations using cables or movable arms that poorly perform in hard environmental conditions resulting from the presence of wind, water and salt in port or railway areas. The rail requires less inspection and maintenance as a result of which the downtime and operational costs are reduced.

Depending on the application, a rail may be mounted on one or two sea-side supports of the crane, one or two land-side supports of the crane, a rail may be mounted on one or two portal beams of the crane, and a rail may be mounted on one or two sill beams of the crane. Per rail, at least one camera/sensor unit must be foreseen enabling to perform scans along the entire length of the rail. The number of cameras and sensors required therefore substantially reduces in comparison to the prior art wherein multiple cameras had to be positioned fixedly on each beam. When mounted substantially vertical, scans can be executed at any operational height of the crane. For other applications, the rail may preferably be positioned horizontally, e.g. along one or more portal beams to scan front-sides and rear-sides of containers, or along one or more sill beams of the crane to scan sides of containers. A combination of substantially vertically mounted and substantially horizontally mounted rails is also conceivable.

The present invention further allows to scan the container surface very early in the container handling process, while the container is being loaded/unloaded. When a rail is mounted for instance on a vertical sea-side support of the crane, the camera/sensor unit can be moved to the operational height of the crane, e.g. 25 meters above the quay, and scan the container ID marked on a front-side or rear-side of the container while the container is still at a height of 25 meters and moved horizontally along the boom of the crane.

Further, the camera/sensor unit can be moved along the rail into a service position for maintenance reasons. In case the rail is vertically mounted, the service position may for instance be the lowest position along the rail. Maintenance of the camera and eventual other electronics in the camera/sensor unit can then be carried out without involvement of exceptionally high boom trucks.

It is further noticed that one or plural camera/sensor units each holding one or plural cameras and/or sensor may be movably mounted along a single rail.

The invention can be used on a wide variety of existing cranes and can be used on next generation cranes that reach heights above 50 meters. For such high cranes, the invention has the additional advantage that scans can be executed on the fly, early in the process, i.e. when the container is still at a height of 50 meters, without complicating maintenance of the electronics.

The power wiring is deployed along the rail or along the crane support or beam where the rail is mounted on, in order to power feed the moving camera/sensor unit. The power may for instance be transferred to the moving camera/sensor unit through sliding contacts or any other means for power transfer. The power lines, and eventually also data lines used for the data connection between the camera/sensor unit and control unit are contained in a dedicated internal space of the rail. The internal space is foreseen for wiring and mechanical components.

In a first embodiment of the invention, the camera/sensor unit moves vertically along one of the sea-side or land-side supports of the crane or substantially vertically if for instance the sea-side or land-side support contains parts that are angled and therefore deviate from the vertical direction. For instance, certain ships lying at the quay extend sideward beyond the quay border and consequently require that the sea-side supports of the crane from a certain height onwards bend inward. As a result, also the rail whereon the camera/sensor unit is movably mounted shall not be vertical over the entire length of such a sea-side support. An advantage of deploying the present invention along a sea-side support of the crane is that the camera/sensor unit can scan a container while the container is moved from or to the ship since the spreader holding the container shall anyhow pass along the sea-side support. The front-side and/or rear-side of the container consequently can be scanned with no or minimal impact on the performance of the crane, but also sides of the container may be scanned by such a camera/sensor unit when the camera(s) is/are positioned in the camera/sensor unit under a certain angle. In case of unloading a terminal from a ship, the information scanned on the front-side and/or rear-side and/or sides of the container becomes available very early in the container handling process. For front-side and/or rear-side, such a camera/sensor unit vertically moving along a sea-side support or land-side support has the additional advantage that a picture can be taken from a direction perpendicular to the front-side and/or rear-side surface. Such a picture taken from a perpendicular direction has a better quality enabling better interpretation by for instance optical character recognition software. Such a vertically or substantially vertically moving camera/sensor unit can flexibly be moved to any height along the crane while maintenance remains simple since the lowest position along the rail can become the service position for the camera/sensor unit.

In a second embodiment of the invention, the camera/sensor unit moves horizontally or substantially horizontally along a portal beam of the crane. Again, the camera/sensor unit will be able to scan the front-side and/or back-side of the container, but this time the container has to be moved to a window at portal beam height where the scan can be carried out. By moving the camera/sensor unit horizontally, scans can be carried out in different lanes. Preferably, the scan is executed while the spreader is vertically lifting/lowering the container in the lane where it is loaded/unloaded at a point in time where the container reaches portal beam height, typically between 13 meter and 16 meter from the quay surface.

It is noticed that both the first embodiment with the rail and movable camera/sensor unit deployed along the vertical sea-side support(s) of the crane and the second embodiment with the rail and movable camera/sensor unit deployed along the horizontal portal beam(s) of the crane can be complemented with state-of-the art sill beam solutions for scanning the sides of the containers.

In a preferred embodiment of the container scanning system according to the present invention, defined by claim 2, the rail comprises a load-bearing structure and an inner structure along which said camera/sensor unit moves.

Indeed, preferably a profile along which the movable camera/sensor unit is moved through a car with wheels, and the load-bearing structure mounted on a leg or beam of the crane are integrated into a single rail. An alternative solution based on a separate non-bearing profile and a bearing profile, is more expensive.

In accordance with an advantageous aspect of the container scanning system according to the present invention, defined by claim 3, the camera/sensor unit comprises a rotatable camera and/or sensor.

A rotatable camera/sensor brings the advantage that a single camera/sensor can make multiple images of a container while it is moving. The rotatable camera/sensor further is advantageous in that it allows the crane to follow the optimal path when unloading or loading a container. This optimal path is calculated by the control unit and takes into consideration the exact location at the quay and the exact location on the ship between which the container is moved. Depending on those locations, the container shall pass along the beam or support along which the camera/sensor is moving under a certain angle. When the camera/sensor is rotatable, the camera/sensor can be rotated in function of the angle or curve that is followed by the optimal path, thereby enabling to make successful images without any impact on the crane operations and performance: the crane does not deviate from the calculated optimal path and there is no need to slow down the crane.

In accordance with an optional aspect of the container scanning system according to the present invention, defined by claim 4, the camera and/or sensor is rotated and controlled to produce three images of the container to respectively scan the front side, short side and rear side of the container.

Indeed, in case the camera/sensor is rotatable, a single camera/sensor can be used to scan three sides of the container while it is loaded/unloaded along the optimal path. Before the container passes the beam or support along which the camera/sensor unit is moving, the front side or rear side of the container can be scanned successfully by rotating the camera/sensor head forward. While the container is passing the beam or support along which the camera/sensor unit is moving, a short side of the container can be scanned. At last, when the container has passed the beam or support along which the camera/sensor unit is moving, the rear side or front side of the container can still be scanned successfully by rotating the camera/sensor head backward.

According to a further advantageous aspect of the container scanning system according to the present invention, defined by claim 5, the camera/sensor unit comprises a tilting camera and/or sensor.

A tilting camera and/or sensor brings the advantage that the scanning system can even better adapt to the optimal path that is followed by the crane. Depending on the location of the container on the ship and/or the size of the ship, the controller shall calculate an optimal path and the crane shall follow that optimal path that is either inclining or declining near the beam or support along which the camera/sensor unit is moving. When the optimal path is inclining, an image made of an approaching container is best taken with camera/sensor tilted downward and an image made of a leaving container is best made with camera/sensor tilted upward. Similarly, when the optimal path is declining, an image made of an approaching container is best taken with camera/sensor tilted upward and an image made of a leaving container is best made with camera/sensor tilted downward. This way, the success rate of container scanning is further improved.

In accordance with a further advantageous aspect of the container scanning system according to the present invention with rotatable and tilting camera and/or sensor, the control unit is further enabled to obtain optimal path information indicative for the optimal load/unload path of the container handling crane; and the control unit is further adapted to control rotation and tilting of the camera/sensor unit in function of said optimal path information.

Indeed, in order to minimize the impact on the terminal performance, i.e. minimize deviations of the optimal path, the camera and or sensor is preferably construed to be rotatable and tilting, and the control unit is adapted to exploit knowledge on the optimal path to control the rotating and tilting of the camera and/or sensor.

Optionally, as defined by claim 7, the camera/sensor unit in the container scanning system according to the present invention further comprises a lighting unit for illuminating the container at least during the scanning.

Indeed, in order to enable operation at night, dusk or dawn, or in certain weather conditions that hamper the visibility, the camera/sensor unit preferably is equipped with a lighting unit that can illuminate the container at least at the point in time a scan is made or an image is taken by the camera.

As is further specified by claim 8, the lighting unit in the container scanning system according to the present invention preferably is rotatable and/or tilting.

Indeed, just like the camera and or sensor, the lighting unit preferably is executed to be rotatable and/or tilting in order to minimize the impact on the terminal performance. Even at night, dusk or down, or in weather conditions that require the use of lighting, the crane shall be enabled to follow the calculated optimal path this way.

According to an optional aspect of the container scanning system according to the present invention, defined by claim 9, the camera/sensor unit further comprises a wireless transceiver for wireless connectivity with the control unit and/or a ground station for transferring information scanned or sensed.

Indeed, the movable camera/sensor unit preferably is equipped with one or more wireless interfaces with a reach of at least 50 meters and a data speed that enables to transfer images within seconds from the camera/sensor unit that captures these images to a control unit or ground station where these images are stored and/or processed. The processing may for instance comprise stitching plural images, denoising images, segmenting an image, OCR'ing portions of an image to recognize alphanumeric information contained therein, etc. As an alternative to offloading the pictures for further processing, certain processing such as for instance optical character recognition or OCR in order to recognize a container ID or other alphanumeric information marked on the container surface may be integrated in variant embodiments of the camera/sensor unit.

Further optionally, as defined by claim 10, the camera/sensor unit in the container scanning system according to the present invention may comprise a power line communications or PLC interface for receiving control signals from the control unit over the power lines.

Indeed, if power wiring is deployed along the rail, support or beam for power feeding the camera/sensor unit, the camera/sensor unit preferably shall be equipped with a power line communications or PLC interface. The PLC interface may enable to receive control signals from the control unit that controls the position/movement of the camera/sensor unit along the rail. The PLC interface however also may be exploited to transfer the image(s) captured by the camera/sensor unit or to transfer the container identification or mark recognized through processing the captured image(s).

According to yet another optional aspect defined by claim 11, the camera/sensor unit in the container scanning system according to the present invention may comprise an RFID transceiver for reading and/or detecting presence of an RFID tag or an RFID seal at a front-side or rear-side of the container.

This way, the movable camera/sensor unit can be used to detect the presence of and/or read the RFID seal or RFID tag that is attached to containers, typically at the door-side, such that use of the camera/sensor unit is not restricted to making images and recognizing alphanumeric container identifications from these images.

As is further indicated by claim 12, the container handling crane whereon the present invention is deployed, is preferably adapted to operate at an operational height above 30 meters.

Although not limited thereto, the invention is particularly advantageous when used on high cranes, having a height above 30 meters.

Advantageously, as is indicated by claim 13, the container handling crane whereon the present invention is deployed, is adapted to operate at an operational height above 50 meters.

The invention is particularly advantageous when used on new or next generation cranes that have heights above 50 meters and the ability to operate at different heights, because the invention enables to scan containers at these heights hence increasing performance of the crane terminal and reducing delay in availability of the information obtained through scanning, while simplifying maintenance of the electronics and components in the camera/sensor unit because the camera/sensor unit can be moved to a service position where it is easy to reach.

In addition to a system for scanning a container as defined by claim 1, the present invention also relates to a corresponding method for scanning a container as defined by claim 14, the method comprising the steps of:

obtaining position information indicative for the operational position of a container handling crane handling the container;

controlling movement of a camera/sensor unit movably mounted along a rail mounted on a support or beam of the container handling crane and containing space for wiring, along the rail in function of the position information;

powering the camera/sensor unit via power lines in the space for wiring; and scanning the exterior surface of the container by a camera and/or sensor comprised in the camera/sensor unit, wherein:

the rail is mounted substantially vertically on a sea-side support or land-side support of the container handling crane;

the operational position is an operational height of the container handling crane; and the camera/sensor unit is moved along the rail to the operational height where the camera and/or the sensor is able to scan the exterior surface of the container while the container is moved across the vertical sea-side support or land-side support by the container handling crane, and/or wherein:

the rail is mounted substantially horizontally on a portal beam of the container handling crane;

the operational position is a distance from the quay border or a lane wherein the container is loaded or unloaded by the container handling crane; and the camera/sensor unit is moved along the rail to a position where it is able to scan the exterior surface of a front-side or rear-side of the container while the container is moved vertically across the portal beam by the container handling crane.

BRIEF DESCRIPTION OF THE DRAWINGS

FIG. 3A, FIG. 3B and FIG. 3C illustrate a second embodiment of the container scanning system according to the present invention;

DETAILED DESCRIPTION OF EMBODIMENT(S)

Figure 1:
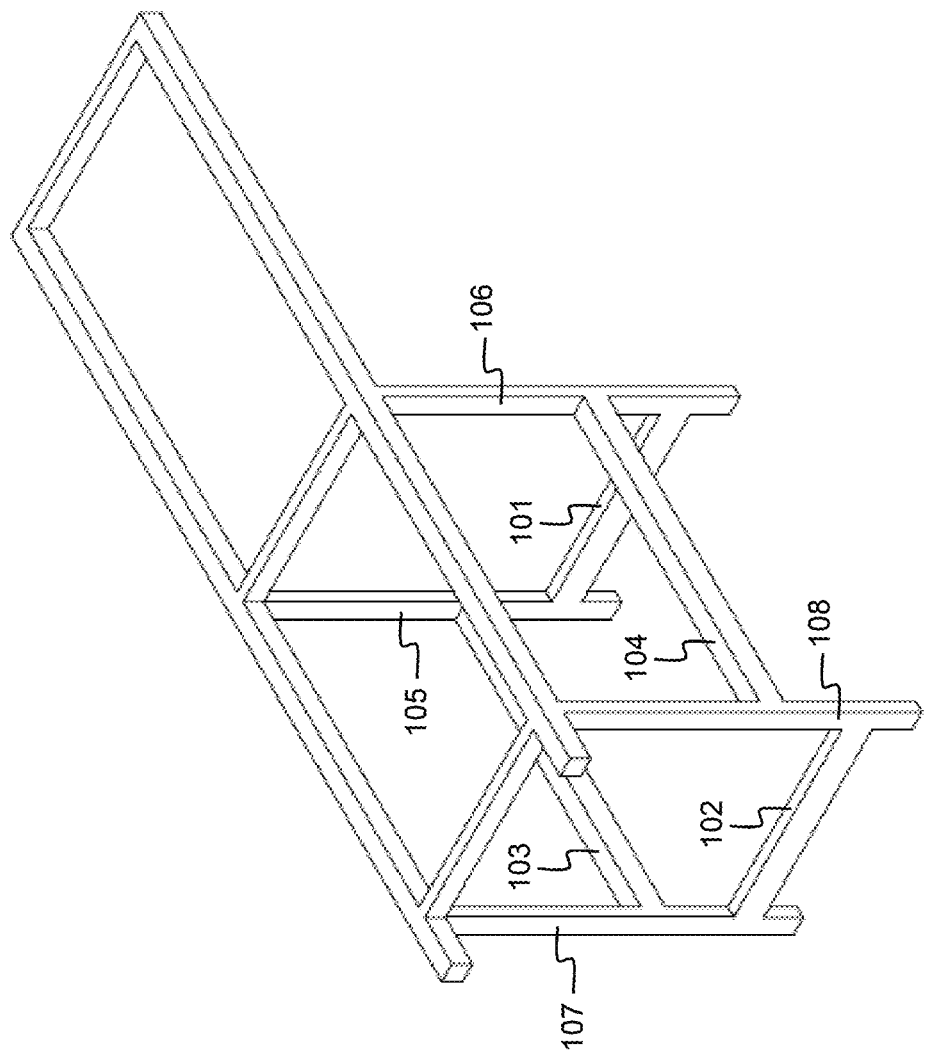
FIG. 1 shows a typical crane whereon the present invention can be deployed.

FIG. 1 shows a crane model that is suitable for deployment of the current invention. Such crane typically has two horizontal sill beams 101 and 102 that are located at a height of 6 meters and two horizontal portal beams 103 and 104 that are located at a height of 13 to 16 meters. The portal beams 103 and 104 are oriented parallel to the crane's boom whereas the sill beams 101 and 102 are oriented perpendicular thereto. Along the crane's boom, a spreader is moving to carry and transfer containers, e.g. from a ship to a storage quay, a train, or a truck, or vice versa. The crane further has four vertical supports of which 105 and 106 represent the sea-side supports and 107 and 108 represent the land-side supports. Such crane is used in ports or railway areas as a result of which the crane is typically designed to have an operational wind load of 25 m/s, to have a breakdown wind load of 50 m/s, to function within a temperature range from −20° C. up to 50° C., and at a humidity of up to 100%.

Figure 2B:
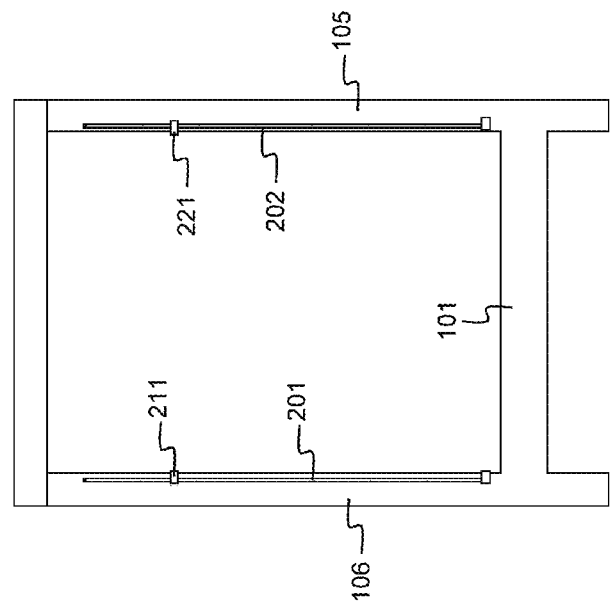
FIG. 2A and FIG. 2B illustrate a first embodiment of the container scanning system according to the present invention.
Figure 2A:
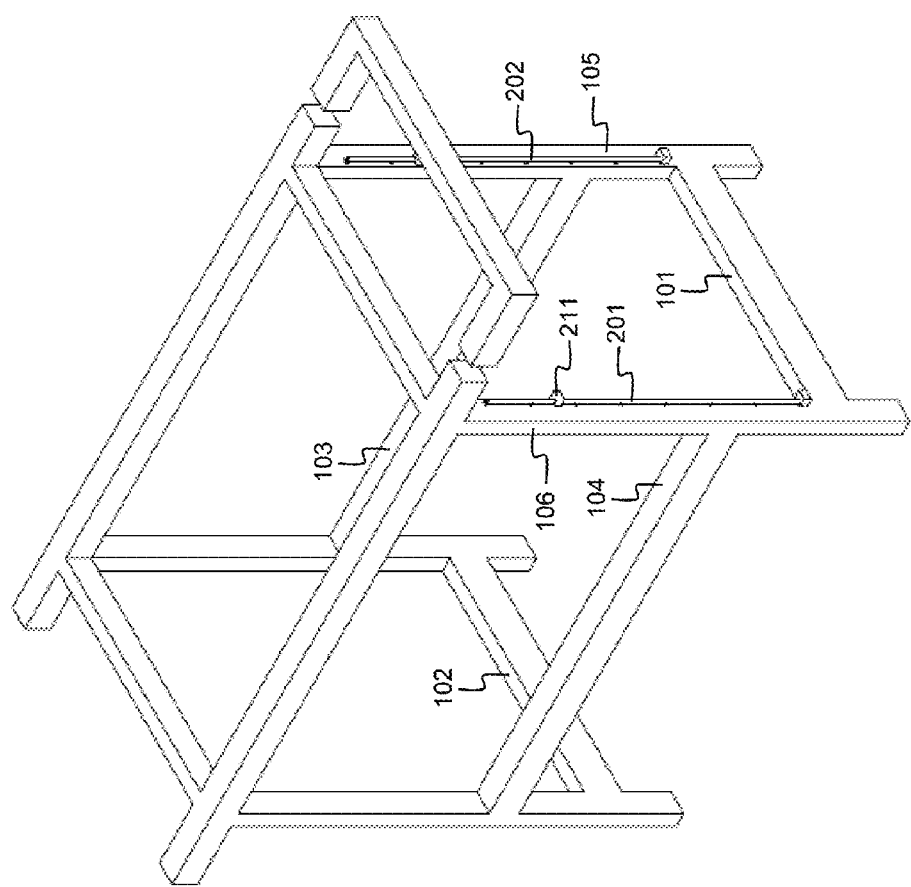

In FIG. 2A and FIG. 2B the crane model of FIG. 1 is redrafted with the same reference numbers 101-106 denoting the sill beams, portal beams and vertical supports. Whereas FIG. 2A shows a three-dimensional view of the crane, FIG. 2B shows a two-dimensional front-view of the crane. FIG. 2A and FIG. 2B further show a first rail 201 that is mounted along a first sea-side vertical support 106 of the crane. A camera/sensor unit 211 is movable mounted along this first rail 201. In a similar fashion, a second rail 202 is mounted along a second sea-side vertical support 105 of the crane. A second camera/sensor unit 221 is movable mounted along this second rail 202. The first and second camera/sensor units 211 and 221 contain one or more cameras and/or one or more sensors that enable to scan a container that is transferred during the transfer. While the spreader is moving along the crane's boom, it will pass the vertical supports 105 and 106. By that time, the camera/sensor units 211 and 221 are controlled to move to the height where the external surface of the container or containers carried by the spreader can be scanned. Typically, the camera/sensor units 211 and 221 will be able to scan the front-side and rear-side of containers that are moved by the spreader. A camera in the camera/sensor units 211 and 221 can scan the front-side and rear-side for visual marks such as a container ID or IMDG code. A camera or sensor can also scan the front-side and rear-side for presence of certain items such as a door, a seal, a label or mark. The camera/sensor units 211 and 221 may either process the information collected by the camera(s) and/or sensor(s) if local processing is foreseen, or they may offload the information collected by the camera(s) and/or sensor(s) to an external ground station or processing unit that further processes the information.

FIG. 3A, FIG. 3B and FIG. 3C again show the crane model of FIG. 1 with the reference numbers 101-106 denoting the same sill beams, portal beams and vertical supports of the crane. Whereas FIG. 3A shows a three-dimensional view of the crane, FIG. 3B shows a two-dimensional side-view and FIG. 3C shows a two-dimensional front-view of the crane. In FIG. 3A, FIG. 3B and FIG. 3C a second embodiment of the present invention is deployed on the crane. This second embodiment also consists of two vertical rails 301 and 302, mounted respectively on the sea-side vertical supports 106 and 105 of the crane. Along these vertical rails 301 and 302, camera/sensor units 311 and 321 are movable mounted and controlled to scan front-sides and rear-sides of containers at different heights while they are transferred by the crane. In addition, the second embodiment contains a third rail 303 and a fourth rail, hidden on the figures, that are horizontally mounted on the portal beams 103 and 104 of the crane. On the third rail 303, a third camera/sensor unit 331 is movable mounted. Similarly but not shown in the drawings, a fourth camera/sensor unit is movable mounted on the fourth rail along portal beam 103. The third and fourth camera/sensor units also enable to scan the front-sides and rear-sides of containers that are handled by the crane. The scanning by the third and fourth camera/sensor units always occurs at a height of 13 to 16 meters, i.e. the height of the portal beams 103 and 104, typically while the containers are moved vertically upward or downward by the crane's spreader. The third and fourth camera/sensor units are controlled to move horizontally to the position or lane where a container is lifted upward or downward. This way, a single camera/sensor unit is sufficient to scan front-sides or rear-sides of containers whereas alternatively multiple fixed cameras/sensors would be required, e.g. one camera/sensor per storage lane. FIG. 3A and FIG. 3C further show that complementary to the rail based camera/sensor system according to the present invention, a sill beam camera system with four cameras 304 fixedly mounted on each sill beam 101 and 102 is deployed. This sill beam solution enables to scan the sides of containers at a height of about 6 meters, i.e. the height of the sill beams 101 and 102. The second embodiment illustrates that the current invention is fully compatible with existing solutions like the sill beam solution 304. Alternatively, when no sill beam solution is deployed yet, additional rails and camera/sensor units may be deployed horizontally along the sill beams of the crane in order to enable scanning the sides of the containers also with a reduced number of cameras.

Figure 4D:
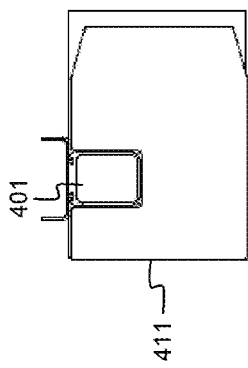
FIG. 4A, FIG. 4B, FIG. 4C and FIG. 4D illustrate the different components of an embodiment of the container scanning system according to the present invention in more detail.
Figure 4C:
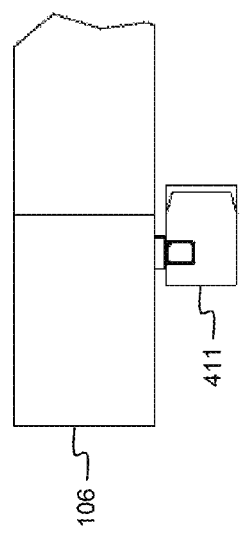
Figure 4A:
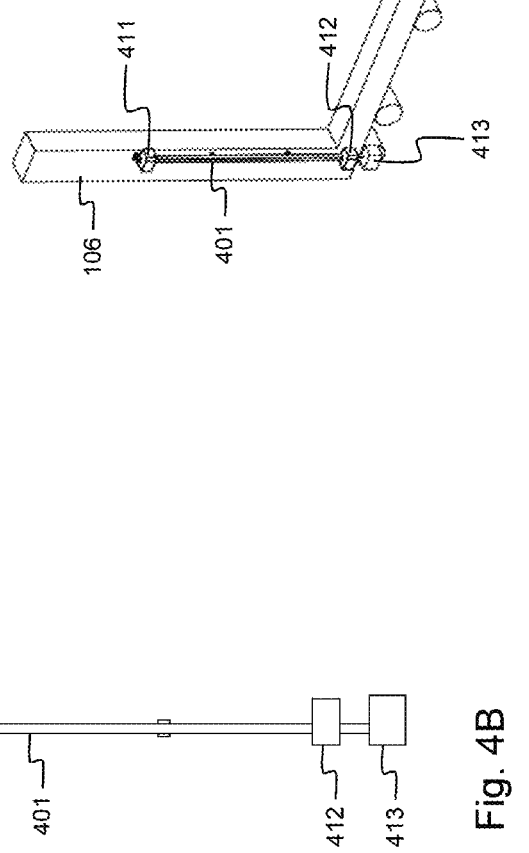
Figure 4B:
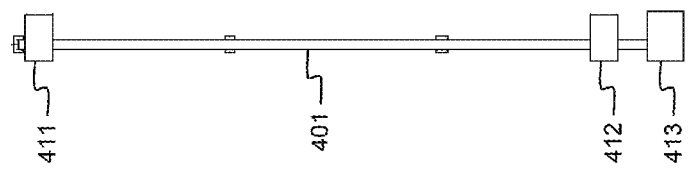

FIG. 4A, FIG. 4B, FIG. 4C and FIG. 4D show a single rail and camera/sensor unit as used in various embodiments of the present invention in more detail. The camera/sensor unit 401 is movably mounted along a rail 401 that is for instance vertically mounted along a vertical support 106 of a crane. The rail 401 may be executed to contain space for wiring, e.g. power wiring towards the camera/sensor unit and/or electrical wiring for signalling and/or data transfer. FIG. 4B further shows the rail electronics box that hosts for instance connectivity for 230 V power cables and UTP network cables. The camera/sensor unit 411 is moved along the rail 401 under control of a control unit that receives information indicative for the operational position, i.e. the height and/or the width and or the depth. The camera/sensor unit will be moved to a position along the rail 401 where it can scan front-side(s), rear-side(s) and/or sides of the container(s) while being handled by the crane. The camera/sensor unit can also be moved to a service position 412, e.g. the lowest position along the rail 401 when the rail is vertically mounted, in order to ease maintenance or reparation of components. The camera/sensor unit 411 shall contain sufficient space to host at least one camera or sensor but preferably may contain multiple cameras and/or sensors. As an example, three cameras may be included, a left camera, a mid camera and a right camera to broaden the window that can be scanned by the camera/sensor unit 411. In another example, the camera/sensor unit 411 may host a camera and an RFID reader enabling to make images of sides of the container as well as to detect the presence of RFID tags such as used in an RFID seal on the door-side of containers.

Figure 5:
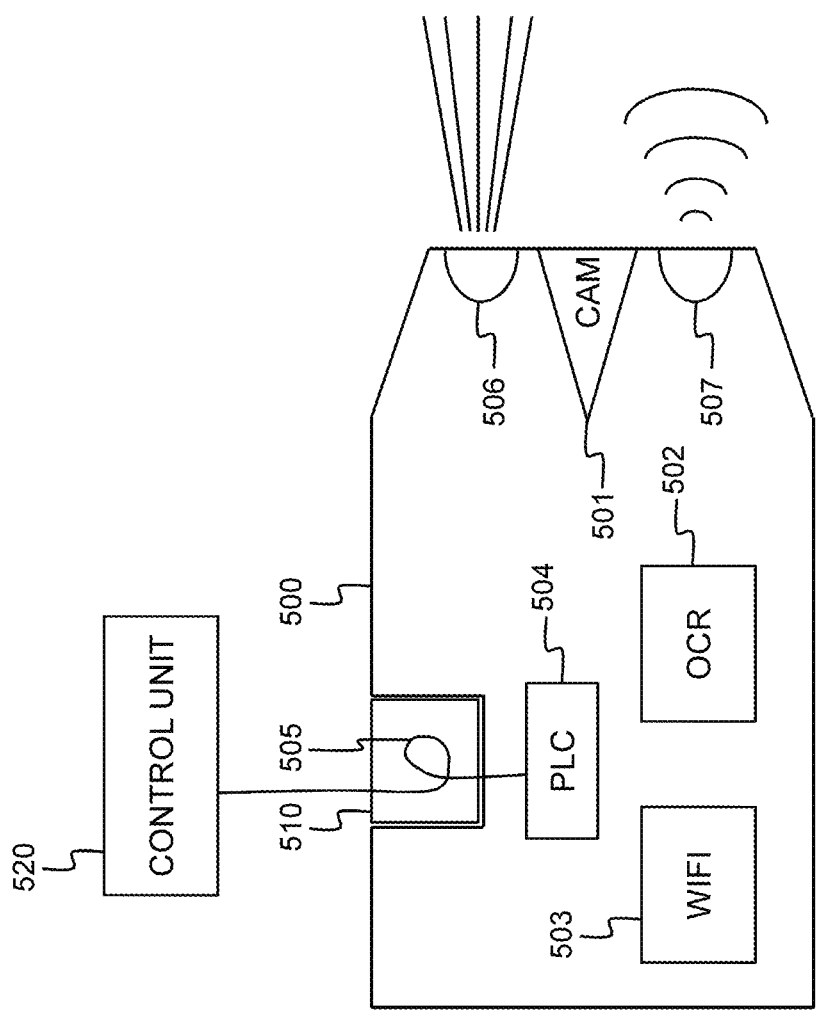
FIG. 5 is a functional block scheme of the camera/sensor unit and control unit in an embodiment of the container scanning system according to the present invention.

FIG. 5 shows the functional blocks that may be integrated in a camera/sensor unit 500 that is movably mounted along rail 510 in an embodiment of the present invention. The camera/sensor unit 500 contains a camera 501 enabling visual inspection of the container surface for marks, IDs, labels, presence of seals, etc. The camera/sensor unit 500 further contains an Optical Character Reading or OCR unit 502 that is functionally coupled to the camera 501 and is able to recognize alphanumeric information in images taken by the camera 501. The images generated by the camera 501 or the alphanumeric information recognized by the OCR unit 502 can be wirelessly communicated to a ground station or processing station in the vicinity of the crane through WiFi transceiver 503. Evidently, other types of wireless communication may be deployed in alternative embodiments of the invention. The camera/sensor unit 500 is controlled to move along rail 510 by control unit 520. The control signals may be transmitted over power wiring 505 that is foreseen in rail 505 in order to power the camera/sensor unit 500. In order to enable the control signals or other information like the information captured by camera 501 or generated by the OCR unit 502 to be transferred over the power wires 505, the camera/sensor unit 500 is equipped with a power line communications or PLC interface 504 that transmits/receives signals and/or data over/from the power lines 505. The camera/sensor unit 500 drawn in FIG. 5 further contains lighting 506 enabling to illuminate the surface of containers that are scanned, and an RFID transceiver 507 enabling to sense the presence of RFID seals on the door-side of containers. The control unit 520 receives information that is indicative for the operational position of the crane, i.e. the height of the spreader, the lane wherein the spreader is lifting a container, etc. This information can be received from for instance a PLC or Programmable Logic Controller that controls the movements of the crane. The information is interpreted by controller 520 and used to control the movements of the camera/sensor unit 500 along the rail 505 to thereby achieve the advantages of the present invention.

Figure 6B:
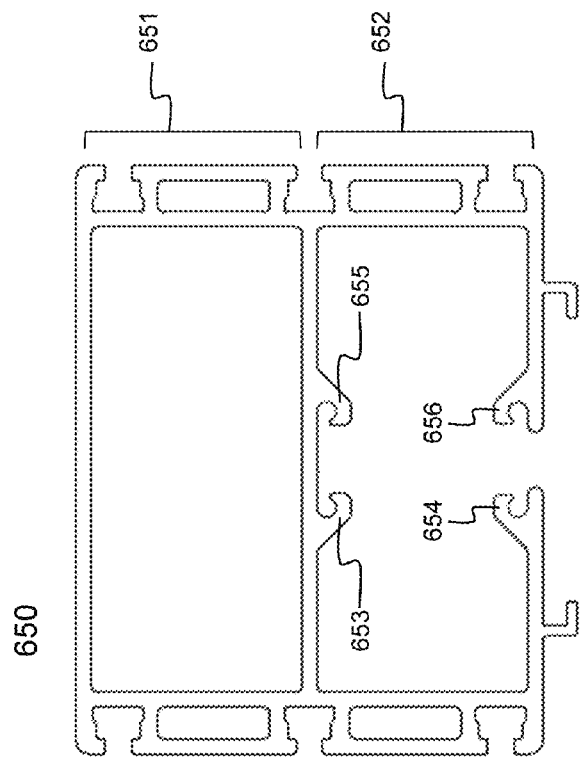
FIG. 6A and FIG. 6B illustrate an embodiment of the container scanning system according to the present invention, wherein the rail comprises a load bearing structure with inner space for cabling, and a separate inner structure along which the camera/sensor unit moves.
Figure 6A:
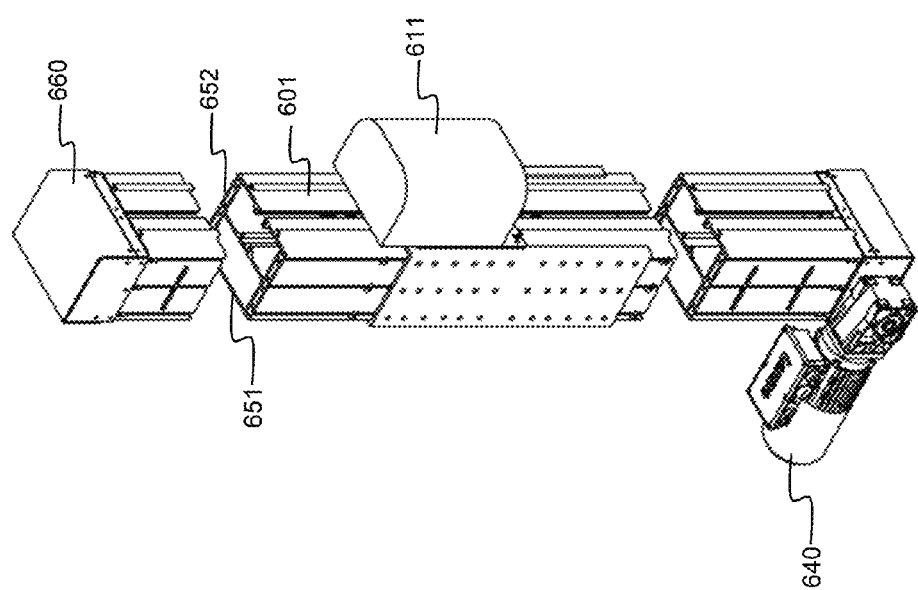

The rails 201, 202, 301, 302 and 401 preferably are designed as depicted in FIG. 6A and FIG. 6B. The rail shown in FIG. 6A and FIG. 6B comprises an aluminium extruded profile 650. The profile 650 is specifically developed for the application and integrates a load-bearing structure 651 and an inner space 652 for a circular timing belt along which a car that holds the camera/sensor unit 611 is moved. The car has wheels that roll along profiles mounted on extrusions 653, 654, 655 and 656 in inner space 652. The engine 640 with gear box is located at the bottom side of the rail. At the top side of the rail, a pulley 660 for the timing belt is positioned. The rail is finished with a natural anodisation layer. The rail is segmented in segments 601 that are 12 meters long and that can be concatenated. Each 8 meter, the rail is mechanically connected with the crane leg. The connection is based on a steel mount that is welded on the crane's leg. At the bottom of the rail, a camera/sensor unit protected service housing may be foreseen. Further at the bottom, a 230 V/20 A power connection is foreseen and a 1 Gbit CAT5e UTP network connection is provided. The power wiring and communication wiring to the camera/sensor unit 611 are contained in the rail, more particularly in the internal chamber of the load-bearing structure 651.

Figure 7A:
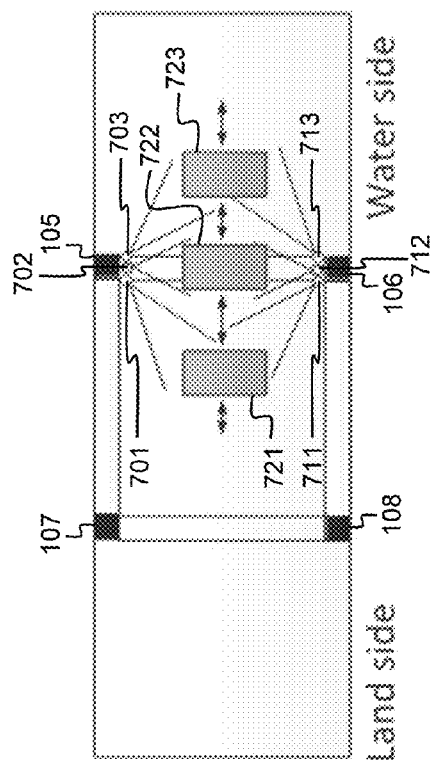
FIG. 7A and FIG. 7B illustrate an embodiment of the container scanning system according to the present invention with multiple cameras per camera/sensor unit.
Figure 7B:
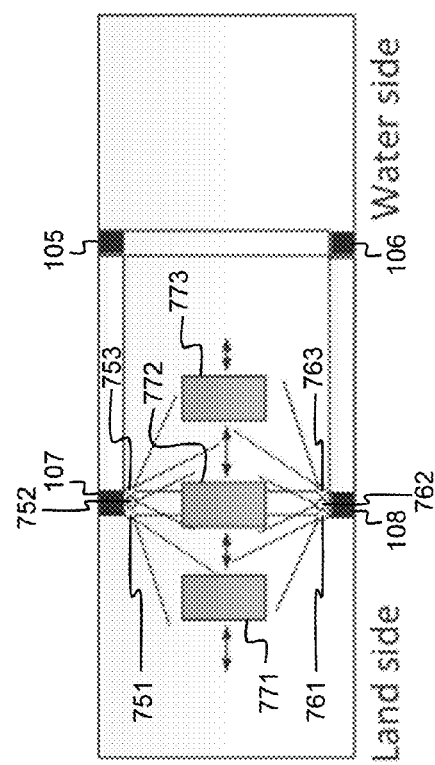

In an embodiment illustrated by FIG. 7A and FIG. 7B, the camera unit holds three identical camera heads with each a lens and a sensor. A high speed 12 Mpixel colour sensor with global shutter may for instance be used. In FIG. 7A, a rail with camera/sensor unit is mounted on the inside of each one of the sea-side supports 105 and 106 of the crane. The camera/sensor unit moving along sea-side support 105 has three camera heads denoted by 701, 702 and 703 in FIG. 7A. The camera/sensor unit moving along sea-side support 106 also has three camera heads denoted by 711, 712 and 713 in FIG. 7A. When a container moves through the crane's legs, the camera/sensor units three times make an image: assuming that the container is moved from a land-side storage area to the ship, the front side of the container is scanned by cameras 701 and 711 at a first point in time when the container is in position 721, the short sides of the container are scanned by cameras 702 and 712 at a second point in time when the container is in position 722, and the back side of the container is scanned by cameras 703 and 713 at a third point in time when the container is in position 723. Obviously, as indicated by the arrows in FIG. 7A, the first point in time, second point in time and third point in time correspond to respective positions 723, 722 and 721 when the container is moved from the ship to a land-side storage area. Alternatively, a short side of the container, a long side (front or back) of the container and a second short side of the container could be scanned in positions 721, 722 and 723 when the spreader would rotate the container over an angle of 90 degrees. In FIG. 7B, a rail with camera/sensor unit is mounted on the inside of each one of the land-side supports 107 and 108 of the crane. The camera/sensor unit moving along land-side support 107 has three camera heads denoted by 751, 752 and 753 in FIG. 7B. The camera/sensor unit moving along land-side support 108 also has three camera heads denoted by 761, 762 and 763 in FIG. 7B. When a container moves through the crane's legs, the camera/sensor units three times make an image: assuming again that the container is moved from a land-side storage area to the ship, the front side of the container is scanned by cameras 751 and 761 at a first point in time when the container is in position 771, the short sides of the container are scanned by cameras 752 and 762 at a second point in time when the container is in position 772, and the back side of the container is scanned by cameras 753 and 753 at a third point in time when the container is in position 773. Obviously, as indicated by the arrows in FIG. 7B, the first point in time, second point in time and third point in time correspond to respective positions 773, 772 and 771 when the container is moved from the ship to a land-side storage area. Alternatively, a short side of the container, a long side (front or back) of the container and a second short side of the container could be scanned in positions 771, 772 and 773 when the spreader would rotate the container over an angle of 90 degrees.

In an alternative embodiment, the three identical camera heads may be replaced with a single camera that is rotatable in function of the container's position and speed such that this single camera can make the three images.

Figure 8:
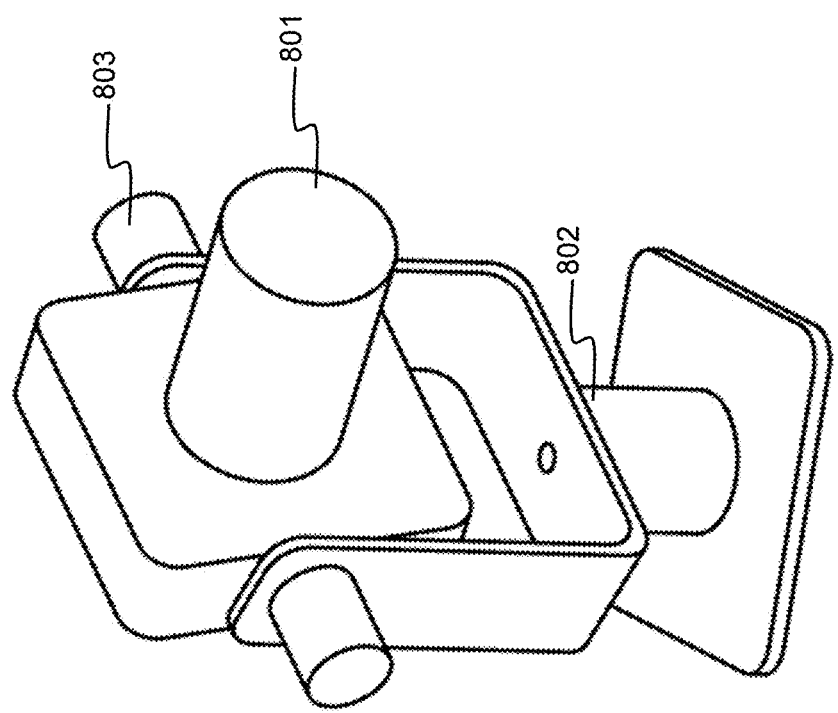
FIG. 8 shows a rotatable and tilting camera for use in an embodiment of the container scanning system according to the invention as illustrated by FIG. 9.
Figure 9:
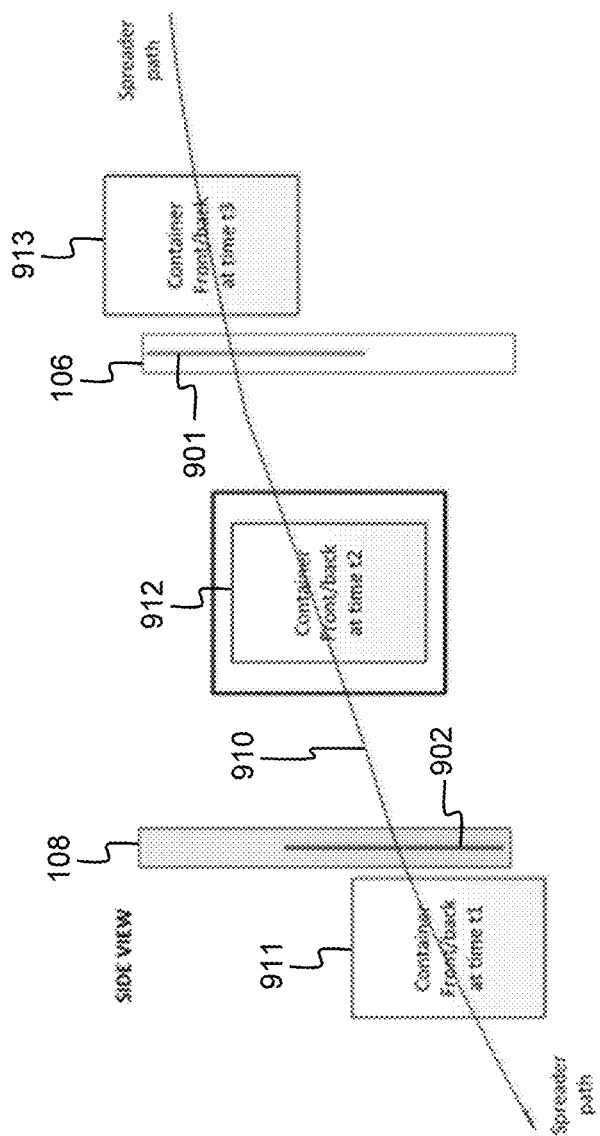
FIG. 9 illustrates an embodiment of the container scanning system according to the present invention with a single rotatable and tilting camera in each camera/sensor unit.

In yet another alternative embodiment illustrated by FIG. 8 and FIG. 9, the camera 801 is rotatable along a rotating shaft 802 and tilting along a tilting shaft 803 such that the imaging direction can be controlled in function of the optimal spreader path 910 that is followed by the spreader and container during an unload/load operation. The crane PLC interface that shares position, speed and optimal spreader path information with the camera unit may for instance use Profibus or Profinet communication. In FIG. 9, a first rail 901 with camera/sensor unit is mounted on vertical sea-side support 106 and a second rail 902 with camera/sensor unit is mounted on vertical land-side support 108. Both camera/sensor units are assumed to be equipped with a rotating and tilting camera as drawn in FIG. 8.

FIG. 9 is a side view of the crane showing the position of the spreader and container at different points in time while following an optimal spreader path 910 to load a container from a land-side storage area onto a ship. The optimal path 910 is supposed to be calculated by control logic, e.g. the crane PLC, that controls the movements of the spreader. In view of the optimal path, the camera/sensor units that move along rails 901 and 902 shall move to their operational height. During the spreader move along optimal path 910, the camera/sensor units shall not be moving. It is further noticed that it is preferred that the camera/sensor units are not moved for each container transfer. The next spreader path should preferably try to reuse the same operational height of the camera/sensor units to improve the lifetime and availability of the moving camera/sensor units. Thus, a camera/sensor unit preferably is only moved when the difference between the optimal spreader path height at the intersection with the rail along which that camera/sensor unit is moved and the current camera/sensor unit operational height exceeds a predefined threshold. This threshold height may be configured in the crane PLC such that the crane PLC can decide to move the spreader and container along a sub-optimal spreader path that allows to keep one or several camera/sensor units at their current operational height.

In FIG. 9, at time t1, the camera/sensor unit moving along rail 902 is rotated and tilted to scan a long side, e.g. the front side, of the container which is at position 911 at t1. At time t2, the camera/sensor unit moving along rail 902 is rotated and tilted to scan the other long side, e.g. the back side, of the container which is at position 912 at t2. While the container is at position 912, the camera/sensor unit moving along rail 901 is rotated and tilted to scan the front side of the container. As such, a second image is obtained of the front side. At last, at time t3, when the container is in position 913, the camera/sensor unit moving along rail 901 is rotated and tilted to make a second scan of the back side of the container. In addition to scanning the long sides of the container, the camera/sensor units moving along rails 901 and 902 may be tilted and rotated to scan a short side of the container at the point in time the spreader move is intersecting the vertical supports 106 and 108.

Figure 10:
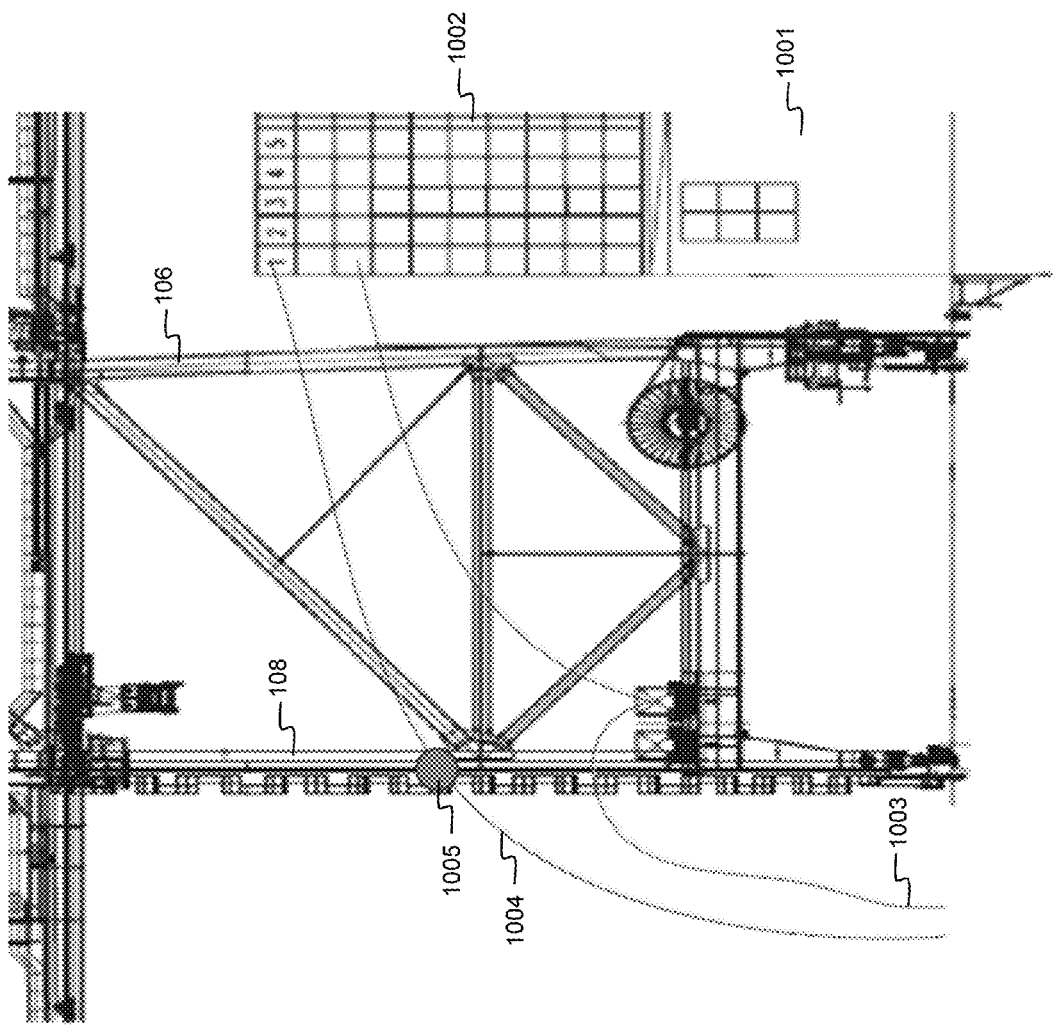
FIG. 10 illustrates the operation of a container scanning system according to the present invention for different optimal spreader paths.

FIG. 10 again shows a side view of the container handling crane with vertical sea-side support 106 and vertical land-side support 108 whereon rails are mounted along which a camera/sensor unit with rotating and tilting camera is moving. FIG. 10 illustrates the transfer of containers 1002 from a storage area to the ship 1001. A first container is transferred following a first optimal path 1003 calculated by the crane's PLC. A second container is transferred following a second optimal path 1004 calculated by the crane's PLC. The moving camera/sensor unit 1005 that scans the containers in the vicinity of vertical support 108 uses the information on the optimal paths to rotate and tilt its camera and eventually also its lighting in the desired direction to scan the container surface. The optimal path 1003 or 1004 followed by the spreader to load a container depends on the destination location of the container on the ship and the origin location of the container on the quay. This optimal path is different for each container: it will be ascending for certain containers near the crane leg 108 where the movable camera 1005 is mounted on, whereas it will be descending for other containers near that same leg 108. Thanks to the use of a rotating and tilting camera and lighting unit in the camera/sensor unit 1005, the present invention allows to make successful scans of the container without deviating from the optimal path and consequently without affecting the crane or terminal performance. Eventually, the optimal path for the next transfer may be modified within limited boundaries to a sub-optimal path that allows to keep the movable camera/sensor unit at its current operational height in order to increase the lifetime of the camera/sensor unit without substantially affecting the crane or terminal performance.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A container scanning system comprising:
 a camera/sensor unit movably mounted on a container handling crane, said camera/sensor unit comprising a camera and/or a sensor for scanning the exterior surface of a container; and
 a control unit operationally coupled to said camera/sensor unit, said control unit being able to obtain position information indicative for the operational position of said container handling crane, and said control unit being adapted to control movement of said camera/sensor unit in function of said position information,
 wherein
 said container scanning system comprises a rail mounted on a support or beam of said container handling crane, said rail containing space for wiring;
 said camera/sensor unit is movably mounted along said rail; and
 said container scanning system further comprises power lines in said space for wiring for power feeding said camera/sensor unit,
 wherein:
 said rail is mounted substantially vertically on a sea-side support or land-side support of said container handling crane;
 said operational position is an operational height of said container handling crane; and
 said camera/sensor unit is moved along said rail to said operational height where said camera and/or said sensor is able to scan the exterior surface of said container while said container is moved across said vertical sea-side support or land-side support by said container handling crane,
 and/or wherein:
 said rail is mounted substantially horizontally on a portal beam of said container handling crane;
 said operational position is a distance from the quay border or a lane wherein said container is loaded or unloaded by said container handling crane; and
 said camera/sensor unit is moved along said rail to a position where it is able to scan the exterior surface of a front-side or rear-side of said container while said container is moved vertically across said portal beam by said container handling crane.

2. A container scanning system according to claim 1, wherein said rail comprises a load-bearing structure and an inner structure along which said camera/sensor unit moves.

3. A container scanning system according claim 1, wherein said camera/sensor unit comprises a rotatable camera and/or sensor.

4. A container scanning system according to claim 3, wherein said control unit is further enabled to obtain optimal path information indicative for the optimal load/unload path of said container handling crane; and
 wherein said control unit is further adapted to control rotation and tilting of said camera/sensor unit in function of said optimal path information.

5. A container scanning system according to claim 3, wherein said camera and/or sensor is rotated and controlled to produce three images of said container to respectively scan the front side, short side and rear side of said container.

6. A container scanning system according to claim 1, wherein said camera/sensor unit comprises a tilting camera and/or sensor.

7. A container scanning system according to claim 6, wherein said control unit is further enabled to obtain optimal path information indicative for the optimal load/unload path of said container handling crane; and wherein said control unit is further adapted to control rotation and tilting of said camera/sensor unit in function of said optimal path information.

8. A container scanning system according to claim 1, wherein said camera/sensor unit further comprises a lighting unit for illuminating said container at least during said scanning.

9. A container scanning system according to claim 8, wherein said lighting unit is rotatable and/or tilting.

10. A container scanning system according to claim 1, wherein said camera/sensor unit further comprises a wireless transceiver for wireless connectivity with said control unit and/or a ground station for transferring information scanned or sensed.

11. A container scanning system according to claim 1, wherein said camera/sensor unit further comprises a power line communications or PLC interface for receiving control signals from said control unit over said power lines.

12. A container scanning system according to claim 1, wherein said camera/sensor unit further comprises an RFID transceiver for reading and/or detecting presence of an RFID tag or an RFID seal at a front-side or rear-side of said container.

13. A container scanning system according to claim 1, wherein said container handling crane is adapted to operate at an operational height above 30 meters.

14. A container scanning system according to claim 1, wherein said container handling crane is adapted to operate at an operational height above 50 meters.

15. A container scanning system according to claim 1, wherein:
said rail is mounted substantially vertically on said sea-side support or land-side support of said container handling crane;
said operational position is said operational height of said container handling crane; and
said camera/sensor unit is moved along said rail to said operational height where said camera and/or said sensor is able to scan the exterior surface of said container while said container is moved across said vertical sea-side support or land-side support by said container handling crane.

16. A container scanning system according to claim 1, wherein:
said rail is mounted substantially horizontally on said portal beam of said container handling crane;
said operational position is said distance from the quay border or said lane wherein said container is loaded or unloaded by said container handling crane; and
said camera/sensor unit is moved along said rail to said position where it is able to scan the exterior surface of said front-side or rear-side of said container while said container is moved vertically across said portal beam by said container handling crane.

17. A container scanning system according to claim 1, wherein:
said rail is mounted substantially vertically on said sea-side support or land-side support of said container handling crane;
said operational position is said operational height of said container handling crane; and
said camera/sensor unit is moved along said rail to said operational height where said camera and/or said sensor is able to scan the exterior surface of said container while said container is moved across said vertical sea-side support or land-side support by said container handling crane,
and wherein:
said rail is mounted substantially horizontally on said portal beam of said container handling crane;
said operational position is said distance from the quay border or said lane wherein said container is loaded or unloaded by said container handling crane; and
said camera/sensor unit is moved along said rail to said position where it is able to scan the exterior surface of said front-side or rear-side of said container while said container is moved vertically across said portal beam by said container handling crane.

18. A method for scanning a container, said method comprising the steps of:
obtaining position information indicative for the operational position of a container handling crane handling said container;
controlling movement of a camera/sensor unit movably mounted along a rail mounted on a support or beam of said container handling crane and containing space for wiring, along said rail in function of said position information;
powering said camera/sensor unit via power lines in said space for wiring; and
scanning the exterior surface of said container by a camera and/or sensor comprised in said camera/sensor unit,
wherein:
said rail is mounted substantially vertically on a sea-side support or land-side support of said container handling crane;
said operational position is an operational height of said container handling crane; and
said camera/sensor unit is moved along said rail to said operational height where said camera and/or said sensor is able to scan the exterior surface of said container while said container is moved across said vertical sea-side support or land-side support by said container handling crane,
and/or wherein:
said rail is mounted substantially horizontally on a portal beam of said container handling crane;
said operational position is a distance from the quay border or a lane wherein said container is loaded or unloaded by said container handling crane; and
said camera/sensor unit is moved along said rail to a position where it is able to scan the exterior surface of a front-side or rear-side of said container while said container is moved vertically across said portal beam by said container handling crane.

19. The method according to claim 18, wherein:
said rail is mounted substantially vertically on said sea-side support or land-side support of said container handling crane;
said operational position is said operational height of said container handling crane; and
said camera/sensor unit is moved along said rail to said operational height where said camera and/or said sensor is able to scan the exterior surface of said container while said container is moved across said vertical sea-side support or land-side support by said container handling crane.

20. The method according to claim 18, wherein:
said rail is mounted substantially horizontally on said portal beam of said container handling crane;
said operational position is said distance from the quay border or said lane wherein said container is loaded or unloaded by said container handling crane; and
said camera/sensor unit is moved along said rail to said position where it is able to scan the exterior surface of said front-side or rear-side of said container while said container is moved vertically across said portal beam by said container handling crane.

* * * * *